United States Patent
Yoshioka (10) Patent No.: US 8,817,341 B2
(45) Date of Patent: Aug. 26, 2014

(54) IMAGE FORMING APPARATUS AND ELECTRIC-POWER CONTROL METHOD USED IN THE IMAGE FORMING APPARATUS

(75) Inventor: Taichi Yoshioka, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 78 days.

(21) Appl. No.: 13/602,621

(22) Filed: Sep. 4, 2012

(65) Prior Publication Data

US 2013/0063787 A1 Mar. 14, 2013

(30) Foreign Application Priority Data

Sep. 14, 2011 (JP) ................................. 2011-201178

(51) Int. Cl.
*H04N 1/00* (2006.01)

(52) U.S. Cl.
CPC .... *H04N 1/00496* (2013.01); *H04N 2201/0094* (2013.01); *H04N 1/00535* (2013.01); *H04N 1/00896* (2013.01); *H04N 1/00904* (2013.01); *H04N 1/00835* (2013.01); *H04N 1/00891* (2013.01)
USPC ............... 358/475; 358/406; 358/1.13; 399/9

(58) Field of Classification Search
None
See application file for complete search history.

(56) References Cited

U.S. PATENT DOCUMENTS

| | | | | |
|---|---|---|---|---|
| 5,932,861 A | * | 8/1999 | Iwaguchi et al. | 235/455 |
| 5,950,037 A | * | 9/1999 | Ko | 399/38 |
| 6,305,602 B1 | * | 10/2001 | Grabowski et al. | 235/379 |
| 2011/0248636 A1 | * | 10/2011 | Liao | 315/149 |
| 2011/0311241 A1 | * | 12/2011 | Nagata | 399/21 |
| 2013/0222831 A1 | * | 8/2013 | Konosu | 358/1.13 |
| 2013/0328944 A1 | * | 12/2013 | Barnhoefer et al. | 345/690 |

FOREIGN PATENT DOCUMENTS

| | | |
|---|---|---|
| JP | 2002-169446 | 6/2002 |
| JP | 2004-170457 | 6/2004 |
| JP | 2008219659 A * | 9/2008 |

* cited by examiner

*Primary Examiner* — Kimberly A Williams
(74) *Attorney, Agent, or Firm* — Oblon, Spivak, McClelland, Maier & Neustadt, L.L.P.

(57) ABSTRACT

According to an embodiment, an image forming apparatus includes: a detecting unit, a storing unit, a threshold determining unit, and a control unit. The detecting unit detects an ambient brightness level at an arbitrary time zone. The storing unit stores information indicating the brightness level detected by the detecting unit. The threshold determining unit determines a threshold serving as a criterion for switching into a low-power-consumption mode according to the information indicating the brightness level stored in the storing unit. The control unit controls switching into the low-power-consumption mode using the threshold determined by the threshold determining unit.

6 Claims, 6 Drawing Sheets

| No | ANGLE OF OPERATING UNIT (°) | RATIO RELATIVE TO BASE THRESHOLD |
|---|---|---|
| 1 | 0 TO 30 | ×1.0 |
| 2 | 31 TO 60 | ×0.9 |
| 3 | 61 TO 80 | ×0.8 |
| 4 | 81 TO 90 | ×0.6 |
| 5 | 91 TO 110 | ×0.4 |
| 6 | 111 TO 150 | ×0.3 |
| 7 | 151 OR HIGHER | ×0.2 |

FIG.7

IMAGE FORMING APPARATUS AND ELECTRIC-POWER CONTROL METHOD USED IN THE IMAGE FORMING APPARATUS

CROSS-REFERENCE TO RELATED APPLICATIONS

The present application claims priority to and incorporates by reference the entire contents of Japanese Patent Application No. 2011-201178 filed in Japan on Sep. 14, 2011.

BACKGROUND OF THE INVENTION

1. Field of the Invention

The present invention relates to image forming apparatuses and electric-power control method used in the image forming apparatus.

2. Description of the Related Art

In recent years, there increase a trend of energy saving in the context of eco-friendliness. Televisions, notebook personal computers (PCs), mobile phones, and the like are typically provided with a function of reducing power consumption by detecting ambient brightness with an illuminance sensor and by adjusting brightness of a screen accordingly. A similar technique for copiers, printers, and the like apparatuses is also known. This technique includes detecting ambient brightness with an illuminance sensor, and automatically switching an apparatus to a low-power-consumption mode when the ambient brightness has fallen below a predetermined threshold.

However, there is a disadvantage with such a conventional function that is performed by detecting ambient brightness with an illuminance sensor and automatically switching into a low-power-consumption mode when the detected brightness has fallen. The disadvantage is that a brightness level undesirably much varies depending on an environment where the apparatus is installed. This makes difficult to determine a threshold for switching into the energy-saving mode, which makes it difficult to appropriately switch the apparatus into the low-power-consumption mode.

There is a need to provide image forming apparatuses and electric-power control methods that make it possible to appropriately switch into a low-power-consumption mode.

SUMMARY OF THE INVENTION

It is an object of the present invention to at least partially solve the problems in the conventional technology.

According to an embodiment, an image forming apparatus includes: a detecting unit, a storing unit, a threshold determining unit, and a control unit. The detecting unit detects an ambient brightness level at an arbitrary time zone. The storing unit stores information indicating the brightness level detected by the detecting unit. The threshold determining unit determines a threshold serving as a criterion for switching into a low-power-consumption mode according to the information indicating the brightness level stored in the storing unit. The control unit controls switching into the low-power-consumption mode using the threshold determined by the threshold determining unit.

According to another embodiment, provided is an electric-power control method for an image forming apparatus that includes a storing unit that stores information indicating an ambient brightness level. The electric-power control method includes: detecting an ambient brightness level at an arbitrary time zone; determining a threshold that serves as a criterion for switching into a low-power-consumption mode according to the information indicating the brightness level stored in the storing unit; and controlling switching to the low-power-consumption mode using the threshold determined at the determining.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments are described in detail below with reference to the accompanying drawings.

First Embodiment

An image forming apparatus 10 according to a first embodiment detects brightness around the area around the apparatus installed by using an illuminance sensor arranged on an operating unit 11, and switches into a shutdown mode where power consumption is minimized when a brightness level becomes below a preset threshold. The image forming apparatus 10 continues brightness detection even in the shutdown mode and, when a brightness level exceeds a preset threshold, exits from the shutdown mode to return into a standby mode.

Figure 1:
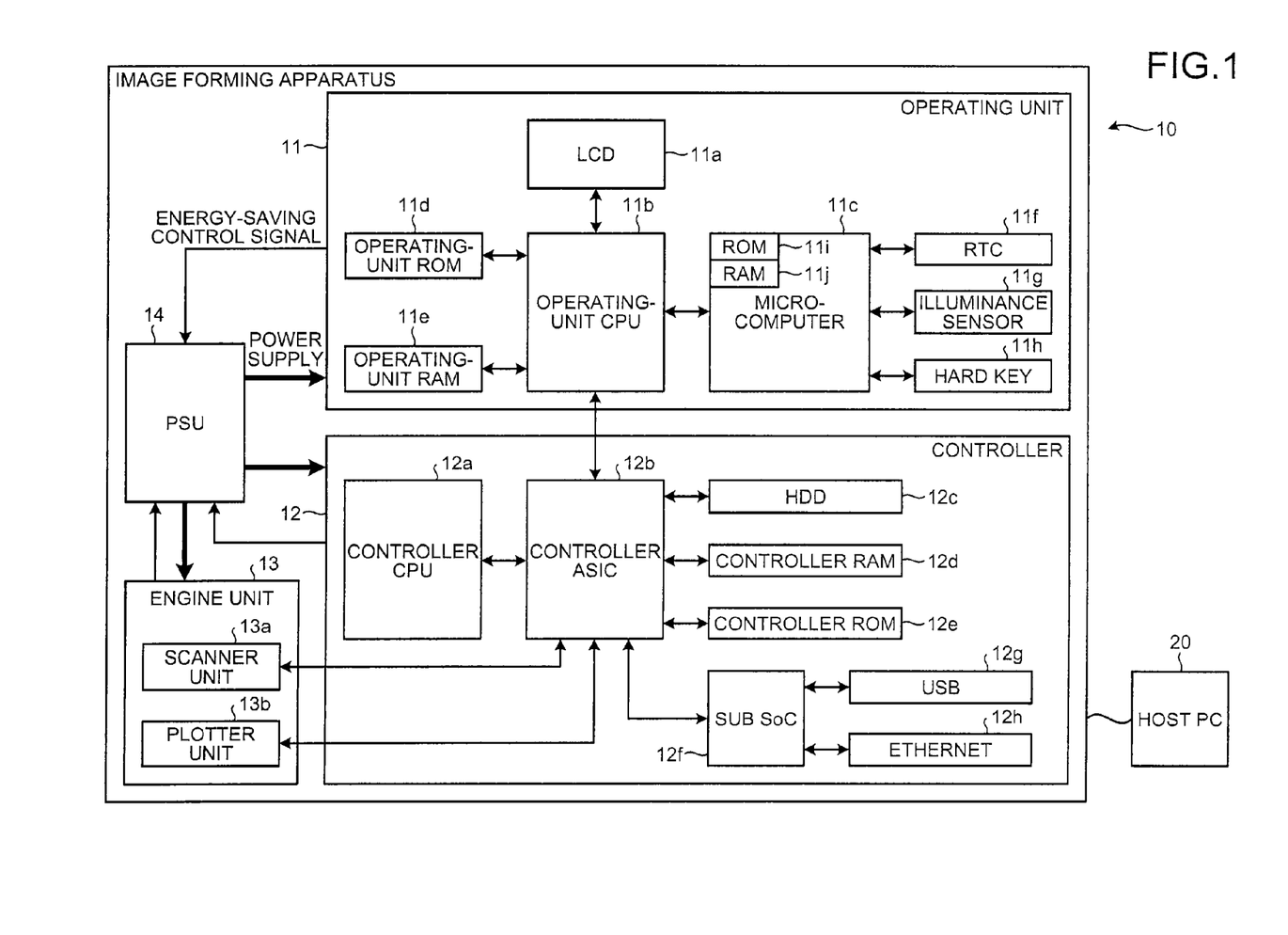
FIG. 1 is a block diagram illustrating an overall configuration of an image forming apparatus according to a first embodiment.

The configuration of the image forming apparatus 10 is described first with reference to FIG. 1. FIG. 1 is a block diagram illustrating an overall configuration of the image forming apparatus according to the embodiment.

The image forming apparatus 10 includes the operating unit 11, a controller 12, an engine unit 13, and a power supply unit (PSU) 14. In the shutdown mode, the image forming apparatus 10 powers off the engine unit 13 and the controller 12, and also powers off constituents of the operating unit 11 except for a microcomputer 11c, a real time clock (RTC) 11f, an illuminance sensor 11g, and a hard key serving as returning trigger.

The operating unit 11 receives an operating input from a user of the image forming apparatus 10. The operating unit 11 includes a liquid crystal display (LCD) 11a, an operating-unit central processing unit (CPU) 11b, the microcomputer 11c, an operating-unit read only memory (ROM) 11d, an operating-unit random access memory (RAM) 11e, the RTC 11f, the illuminance sensor 11g, and a hard key 11h.

The LCD 11a provides screen display. The operating-unit CPU 11b controls the entire operating unit 11. The microcomputer 11c monitors the illuminance sensor 11g, the hard key 11h, the RTC 11f, and the like, thereby controlling switching into and exiting from an energy-saving mode, pulse width modulation (PWM) of a light emitting diode (LED), and the like. The microcomputer 11c includes a built-in ROM 11i and a built-in RAM 11j. The RAM 11j stores information indicating a brightness level detected by the illuminance sensor 11g.

The microcomputer 11c determines a threshold serving as a criterion for switching into a low-power-consumption mode according to the information indicating the brightness level stored in the RAM 11j. For example, the microcomputer 11c acquires information indicating a brightness level at nighttime after workers have left an office and information indicating a brightness level during daytime from the RAM 11j. The microcomputer 11c calculates an average value of the brightness level at nighttime after the workers have left the office and the brightness level during daytime and determines the average value as the threshold for switching into the shutdown mode.

The microcomputer 11c also acquires the information indicating the brightness level at nighttime after the workers have left the office and information indicating a brightness level after work starting time from the RAM 11j, for example. The microcomputer 11c calculates an average value of the brightness level at nighttime after the workers have left the office and the brightness level after the work starting time, and determines the average value as a threshold for exiting from the shutdown mode. It is preferable that the microcomputer 11c adjusts the threshold determined based on the information indicating the ambient brightness level in accordance with a tilt angle of the illuminance sensor 11g arranged on the operating unit 11.

The microcomputer 11c also controls switching into an energy-saving mode using the thus-determined threshold. More specifically, the microcomputer 11c monitors outputs of the illuminance sensor 11g at regular time intervals and compares each output with the threshold, thereby controlling a signal for switching into the low-power-consumption mode (energy-saving mode). The microcomputer 11c polls the outputs of the illuminance sensor 11g at regular time intervals and performs threshold determination. The microcomputer 11c also records a status of illuminance change in the built-in RAM 11j for threshold determination learning.

The RAM 11j built in the microcomputer 11c is generally limited in capacity. For this reason, the illuminance data recorded in a hard disk drive (HDD) is passed to the controller when the image forming apparatus 10 has returned to the standby mode. When the shutdown mode continues for a long time and the capacity of the RAM 11j of the microcomputer 11c should become insufficient to record the illuminance data, the microcomputer 11c copes with this situation by issuing an exit factor for exiting from the shutdown mode to wake up the controller 12 or by recording the illuminance data in a manner of not recording a portion(s) where changes in illuminance with time are small rather than waking up the controller 12.

The operating-unit ROM 11d is a ROM for the operating-unit CPU 11b. The operating-unit RAM 11e is a RAM for the operating-unit CPU 11b. The RTC 11f clocks time.

The illuminance sensor 11g detects ambient brightness at an arbitrary time zone of a day. Outputs of the illuminance sensor 11g are input to an analog-to-digital (A/D) converter (not shown) of the microcomputer 11c. The hard key 11h is for use by a user to operate the apparatus. The illuminance sensor 11g may detect ambient brightness at the arbitrary time zone every day. The illuminance sensor 11g may detect ambient brightness at the arbitrary time zone a plurality of times.

Figure 2:
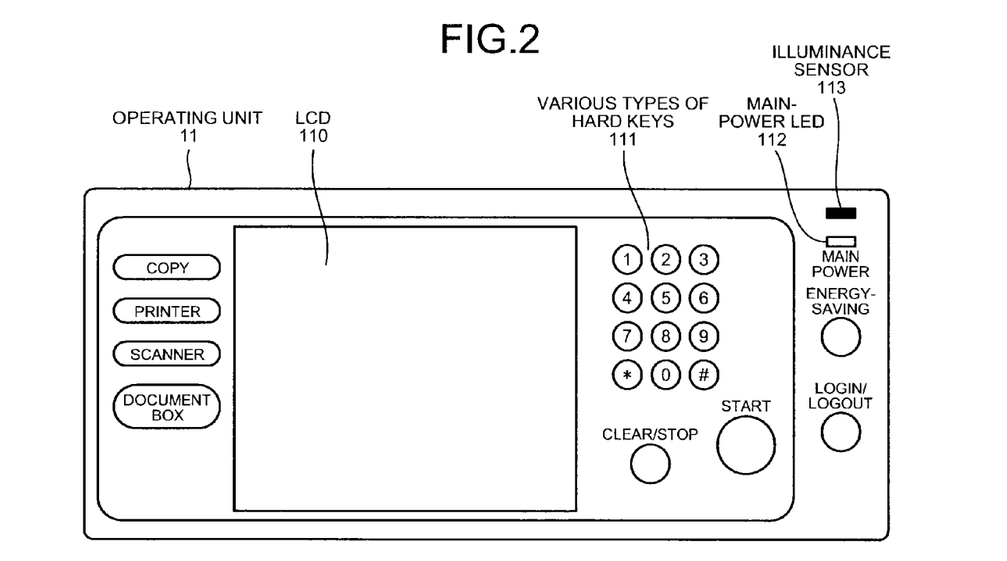
FIG. 2 is an external view of an operating unit of the image forming apparatus.

Appearance of the operating unit 11 is described below with reference to FIG. 2. FIG. 2 is an external view of the operating unit of the image forming apparatus. As illustrated in FIG. 2, arranged on the operating unit 11 are an LCD 110, various types of hard keys 111, a main-power LED 112, and an illuminance sensor 113.

The LCD 110 displays an operating screen. The LCD 110 is also capable of receiving a soft key operation entered using a touch panel. The various types of hard keys 111 are hard keys for use by the user to operate the apparatus.

The main-power LED 112 is an LED for notifying an operating status of the apparatus to the user. The illuminance sensor 113 is a sensor that detects brightness. A photodiode or the like can be used as the illuminance sensor 113. The illuminance sensor 113 needs to be continuously supplied with power because the illuminance sensor 113 monitors brightness continuously.

For this reason, it is convenient, in terms of design, to arrange the illuminance sensor 113 on the operating unit 11 to which power is supplied for key entry monitoring and LED indications even during an energy-saving mode in many cases. Furthermore, the illuminance sensor 113 is preferably arranged near the operating unit 11 where paper or the like is less likely placed. This is because when the illuminance sensor 113 is arranged on a top portion of the image forming apparatus 10, a to-be-printed document or the like can be placed by a user on the top portion and undesirably blocks detection by the illuminance sensor 113.

The controller 12 in FIG. 1 controls the entire image forming apparatus 10. The controller 12 includes a controller CPU 12a, a controller application-specific integrated circuit (ASIC) 12b, an HDD 12c, a controller RAM 12d, a controller ROM 12e, a sub system on chip (SoC) 12f, a universal serial bus (USB) 12g, and an Ethernet (registered trademark) 12h.

The controller CPU 12a performs control of the entire controller 12, drawing processing on print data transmitted from a host PC 20, and the like. The controller ASIC 12b performs processing such as compression/decompression, rotation, and editing on an image transmitted from a scanner unit 13a, and controls the controller RAM 12d and the HDD 12c.

The HDD 12c stores image data, backup data stored for a case of jamming, and other device data. The controller RAM 12d is a working memory for the controller CPU 12a and the controller ASIC 12b. The controller ROM 12e is a ROM for the controller CPU 12a.

The sub SoC 12f controls data input/output for a USB, Ethernet, or the like device. In the energy-saving mode, power supply to the controller ASIC 12b and the controller CPU 12a are cut off; the sub SoC 12f performs network monitoring and makes packet responding for Ethernet connection and the like.

The USB 12g is a USB interface and connected to the host PC 20. The Ethernet 12h is an Ethernet interface and connected to the host PC 20.

The engine unit 13 performs document scanning, printing, and the like. The engine unit 13 includes the scanner unit 13a and a plotter unit 13b. The scanner unit 13a scans a document using charge coupled devices (CCDs) to obtain digital image data and performs image processing such as shading correction, background erasing, and fixed-length coding on the image data. The plotter unit 13b prints the image processed by the scanner unit 13a and the controller 12.

The PSU 14 supplies power to the operating unit 11, the controller 12, and the engine unit 13. The host PC 20 connected to the image forming apparatus 10 provides a printing instruction, a scanning instruction, and the like to the image forming apparatus 10.

Figure 3:
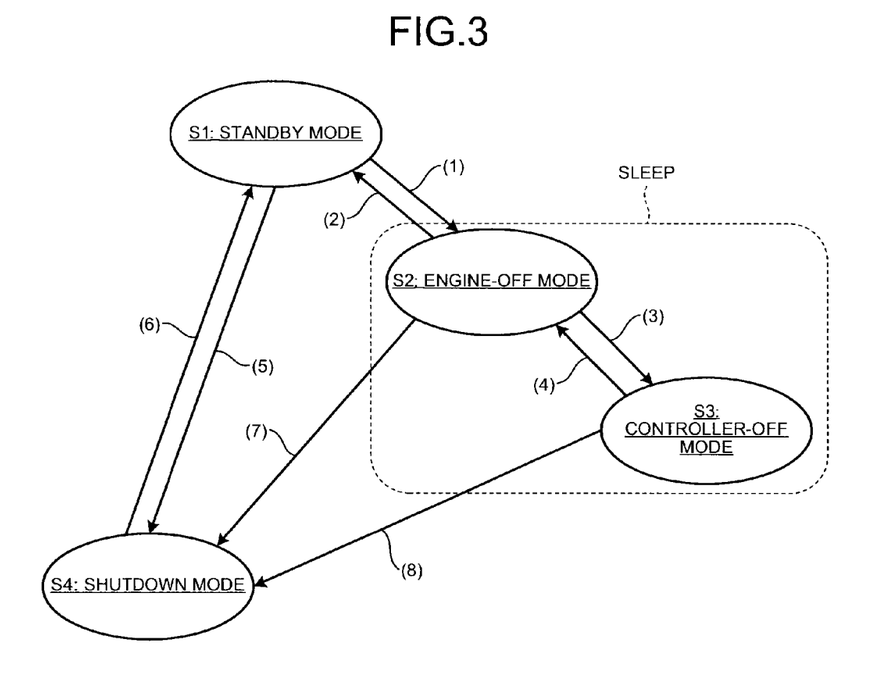
FIG. 3 is an explanatory diagram of transitions among energy-saving modes of the image forming apparatus.

Transitions among energy-saving modes of the image forming apparatus are described below with reference to FIG. 3. FIG. 3 is a diagram for explaining the transitions among the energy-saving modes of the image forming apparatus. The image forming apparatus 10 detects brightness around the apparatus using the illuminance sensor 11*g* arranged on the operating unit 11, and switches into the shutdown mode where power consumption is minimized when a detected brightness level falls below a preset threshold as illustrated in FIG. 3. The image forming apparatus 10 continues brightness detection even in the shutdown mode, and exits from the shutdown mode to return into the standby mode when a detected brightness level exceeds a preset threshold.

The threshold for brightness determination is set (manually set) to a setting value initially set by a user or set (automatically set) by time-based automatic learning. Switching into or exiting from the shutdown mode is not caused only in response to brightness but also caused in response to key operation entered by a user or at a preset time set by a user from the operating unit 11.

Each modes illustrated in FIG. 3 will be described. The "standby mode" is a mode where all the power systems are ON and the apparatus is ready for immediate use. The "engine-OFF mode" is a mode where power supply to the engine unit 13 is OFF. Power consumption in the engine-OFF mode is lower than that in the standby mode. The "controller-OFF mode" is a mode where power supply to the controller CPU 12*a* and the controller ASIC 12*b* is OFF. In the controller-OFF mode, power is supplied to the sub SoC 12*f* so as to respond through network; accordingly, it is possible to respond to a print job from the host PC 20.

The "shutdown mode" is a mode where power supply is cut off except for power supplying to the microcomputer 11*c*, the illuminance sensor 11*g*, the hard key 11*h* serving as the exit factor, and the main-power LED 112 of the operating unit 11. Even the sub SoC 12*f* of the controller 12 is in an OFF state in the shutdown mode. Accordingly, the apparatus cannot respond to a print job from the host PC 20 and becomes invisible from the network; however, power consumption is minimized in the shutdown mode. Power consumption of the apparatus can be reduced by placing the apparatus in the shutdown mode in a circumstance such as nighttime where the apparatus is not used. Thus, the modes are in the following relationship in terms of power consumption: (standby mode) >(engine-OFF mode)>(controller-OFF mode)>(shutdown mode).

Conditions for transitions between the modes are described below using reference numerals in parentheses indicated in FIG. 3. Switching from the standby mode to the engine-OFF mode indicated by (1) in FIG. 3 is caused by a key operation (for switching into a sleep mode) entered by a user, timer-activated automatic transition, or the like.

Switching from the engine-OFF mode to the controller-OFF mode indicated by (3) in FIG. 3 is caused by timer-activated automatic transition. Switching from the controller-OFF mode to the engine-OFF mode indicated by (4) in FIG. 3 or switching from the engine-OFF mode to the standby mode indicated by (2) in FIG. 3 occurs when an exit factor (opening/closing of a pressure plate, document loading onto a document feeder (DF), receipt of a print job from the host PC, or the like) is detected.

Switching from the standby mode to the shutdown mode indicated by (5) in FIG. 3 occurs in response to the illuminance sensor (when brightness has decreased), a key operation (for switching into the shutdown mode) entered by a user, or at a preset time. Note that switching into the shutdown mode does not occur while the apparatus is printing or during user operation. Switching from the shutdown mode to the standby mode indicated by (6) in FIG. 3 occurs in response to the illuminance sensor (when brightness has increased), a key operation entered by a user, or at a preset time. Switching from any one of the engine-OFF mode and the controller-OFF mode to the shutdown mode indicated by (7) and (8) in FIG. 3 occurs in response to the illuminance sensor (when brightness has decreased) or at a preset time.

The threshold of the brightness level can be set manually or automatically. Manual setting is performed by a user by setting the threshold from the operating unit 11. During the manual setting, an actual (current) brightness level detected by the illuminance sensor 11*g* is displayed on the LCD 11*a* on the operating unit 11. Furthermore, not only the current brightness level but changes in brightness throughout a day are preferably recorded, and the brightness changes throughout the day are displayed as a graph on the LCD 11*a* on the operating unit 11. The user can use these information as reference data in determination of the threshold.

To automatically set a threshold of the brightness level, the image forming apparatus 10 detects ambient brightness and records brightness information at a preset time zone. The image forming apparatus 10 sets the threshold of the brightness level based on the recorded brightness information.

Figure 4:
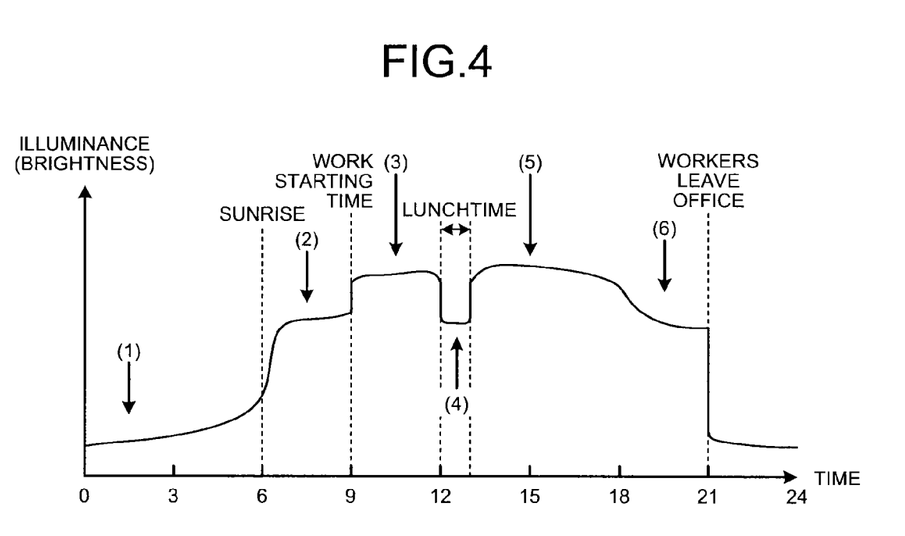
FIG. 4 is a diagram for explaining how brightness around the image forming apparatus changes.

Changes in brightness around the image forming apparatus 10 are described below with reference to FIG. 4. FIG. 4 is a diagram for explaining how brightness around the image forming apparatus 10 changes. FIG. 4 illustrates an example of changes in brightness in one day in an office environment where an image forming apparatus is installed in many instances. Generally, brightness increases from around sunrise which is about 6:00, and further increases at work starting time which is about 9:00 because lights are turned on. Brightness slightly decreases at lunchtime because the lights are turned off for energy saving. Brightness gradually decreases from around sunset, and drastically decreases when all the workers leave the office and the lights in the office are turned off.

Image forming apparatuses installed in offices are generally required to be in a ready-to-use state during a period from the work starting time to the time when workers leave the office. Accordingly, the threshold for switching into the shutdown mode is preferably between a brightness level at nighttime after the workers leave the office (see (1) in FIG. 4) and a brightness level at daytime (see (5) in FIG. 4) or a brightness level after sunset (see (6) in FIG. 4).

The threshold for restoring from the shutdown mode is preferably between the brightness level at nighttime after the workers leave the office (see (1) in FIG. 4) or a brightness level after sunrise (see (2) in FIG. 4) and a brightness level after the work starting time (see (3) in FIG. 4).

The microcomputer 11*c* of the operating unit 11 measures illuminance with reference to time provided by the RTC 11*f* and records the illuminance. Characteristics of brightness changes that depend on a user-installed environment can be determined by storing information measured at certain time zones (e.g., (1) to (6) in FIG. 4) on a daily basis. The threshold for switching into the shutdown mode and the threshold for exiting from the shutdown mode are automatically determined based on the recorded information.

Meanwhile, each timing indicated by numerals (1) to (6) in FIG. 4 may be either a time or a time zone having a predetermined duration. Influence of an abrupt change in brightness can be lessened by performing measurement several times in the time zone and statistical processing thereof.

The time zones (1) to (6) in one day are illustrated in FIG. 4, which are described below. The time zone (1) in FIG. 4 is midnight when no one is likely in the office. The time zone (2) in FIG. 4 is a period from sunrise to the work starting time (when workers come to the office). Ambient brightness in this time zone is during when although there is sunlight, window shades are drawn and/or lights are off. The time zone (3) in FIG. 4 is working time (in the morning). The window shades are open, and the lights are generally on in this time zone. The time zone (4) in FIG. 4 is lunchtime. The lights are off in many for energy saving in this time zone. The time zone (5) in FIG. 4 is working time (in the afternoon). The time zone (6) in FIG. 4 is working time (in the nighttime). Ambient brightness in this time zone is such that there is no sunlight and lights are on. The time zones (1) to (6) are only exemplary and it is possible to perform measurement more frequently, or to add measurement timing set by a user.

Figure 5A:
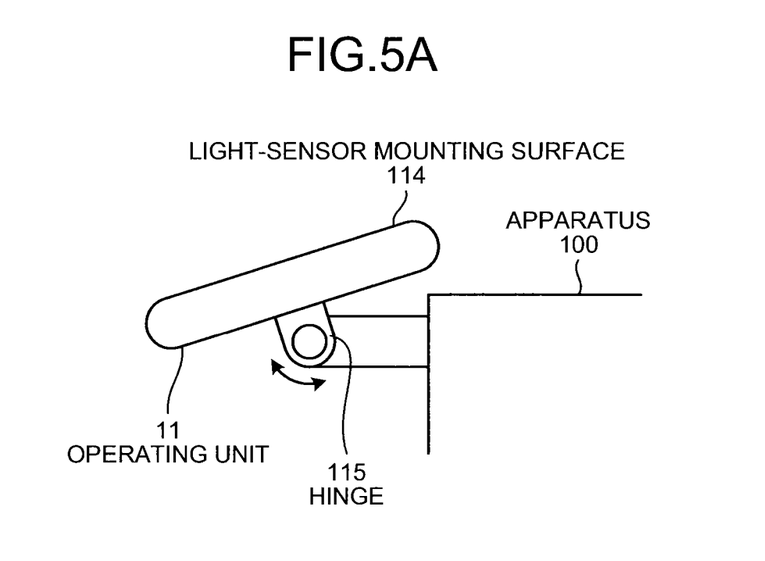
FIGS. 5A and 5B are diagrams for explaining tilts of the operating unit.
Figure 5B:
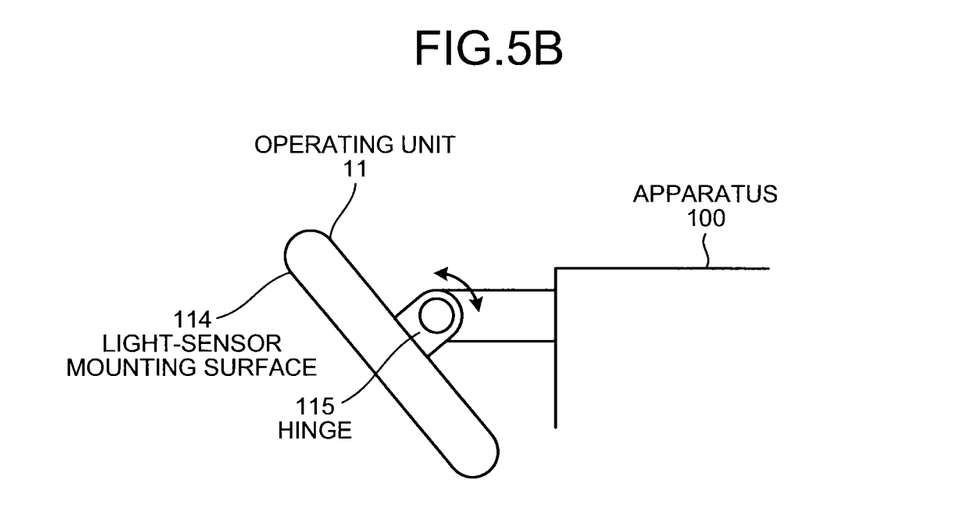

The threshold of the brightness level may be configured to be adjusted in accordance with a tilt angle of the operating unit 11. FIGS. 5A and 5B are diagrams for explaining the operating unit that is set tilted. There are various kinds of operating unit in the context of universal designs so tilted that even a user on a wheelchair can easily operate. FIG. 5A illustrates a hinge 115 on which the operating unit 11 pivots so that a light-sensor mounting surface 114 faces upward, thereby adjusting the operating unit 11 set to an angle appropriate for operation by a standing user. On the other hand, FIG. 5B illustrates the hinge 115 on which the operating unit 11 pivots so that the light-sensor mounting surface 114 to face downward, thereby adjusting the operating unit 11 set to an angle appropriate for operation by a user sitting in a wheelchair or the like.

Lighting fixtures are generally arranged on a ceiling in an office where the image forming apparatus 10, such as a printer or a copier, is installed; and therefore light is typically shed downward. Accordingly, even when lighting fixtures in the office in the condition illustrated in FIG. 5A and those in FIG. 5B are identical in brightness, light received by the illuminance sensor 11g illustrated in FIG. 5B is undesirably smaller than that illustrated in FIG. 5A. When a threshold for switching into the energy-saving mode is determined with reference to the condition illustrated in FIG. 5A, unintended switching into the energy-saving mode may occur when the operating unit 11 is placed in such a manner illustrated in FIG. 5B.

Figure 6:
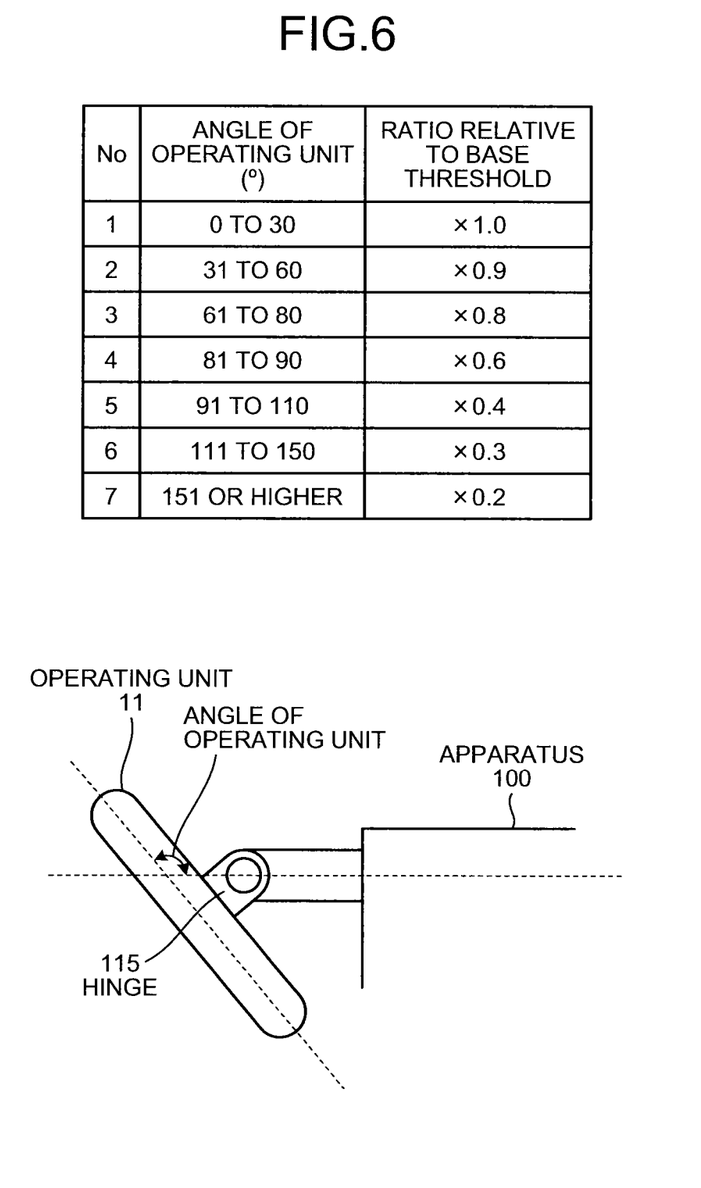
FIG. 6 is a diagram for explaining relations between tilt angles of the operating unit and thresholds.

Described below is an example of adjusting the threshold of the brightness level in accordance with a tilt angle of the operating unit 11 with reference to FIG. 6. FIG. 6 is a diagram for explaining relations between tilt angles of the operating unit and thresholds. An angle of the operating unit 11 is detected; and the threshold for switching into the standby mode is adjusted in accordance with the angle to solve the problem due to an amount of light received by the illuminance sensor 11g undesirably varying depending on the tilt angle of the illuminance sensor 11g arranged on the operating unit 11.

Lighting fixtures are generally arranged above the apparatus. Accordingly, adjustment is performed such that the threshold decreases the more, relative to a base threshold of which angle is small; the angle of the operating unit 11 increases the more. Illustrated are the classes into which the angles of the operating unit are classified and ratios assigned to the classes in FIG. 6, which is only an exemplary. More appropriate values can be obtained through experiments or the like. For example, as illustrated in FIG. 6, the base threshold is to be multiplied by "0.9" when the angle of the operating unit 11 is in a class of "31 to 60 degrees".

The ratio of the received-light amount assigned to each angle class of the operating unit 11 can be determined on-site measurement at the time when the apparatus is actually installed. More specifically, the apparatus preferably includes a menu for brightness environment settings in an initial setting menu. An instruction is displayed on a graphical user interface (GUI) (LCD) on the operating unit 11 for a user to tilt the operating unit 11 to each of the angles from No. 1 to No. 7 in order, and to measure illuminance at each angle. The ratio for the threshold that depends on the angle is determined based on the measured illuminance. Thus, thresholds appropriate for the user-installed environment can be obtained. For example, when the apparatus is installed near a window, relatively more light laterally enters the apparatus. In such a case, a received-light amount is less likely to decrease even when the tilt angle of the operating unit 11 become larger. However, influence due to the tilt of the operating unit 11 can be minimized by thresholds determined based on brightness obtained by on-site measurement as described above.

When the operating unit 11 is configured to be tiltable as described above, influence of tilt of the operating unit 11 is reduced by measuring not only illuminance but also a tilt angle and correction in accordance with the tilt angle.

Figure 7:
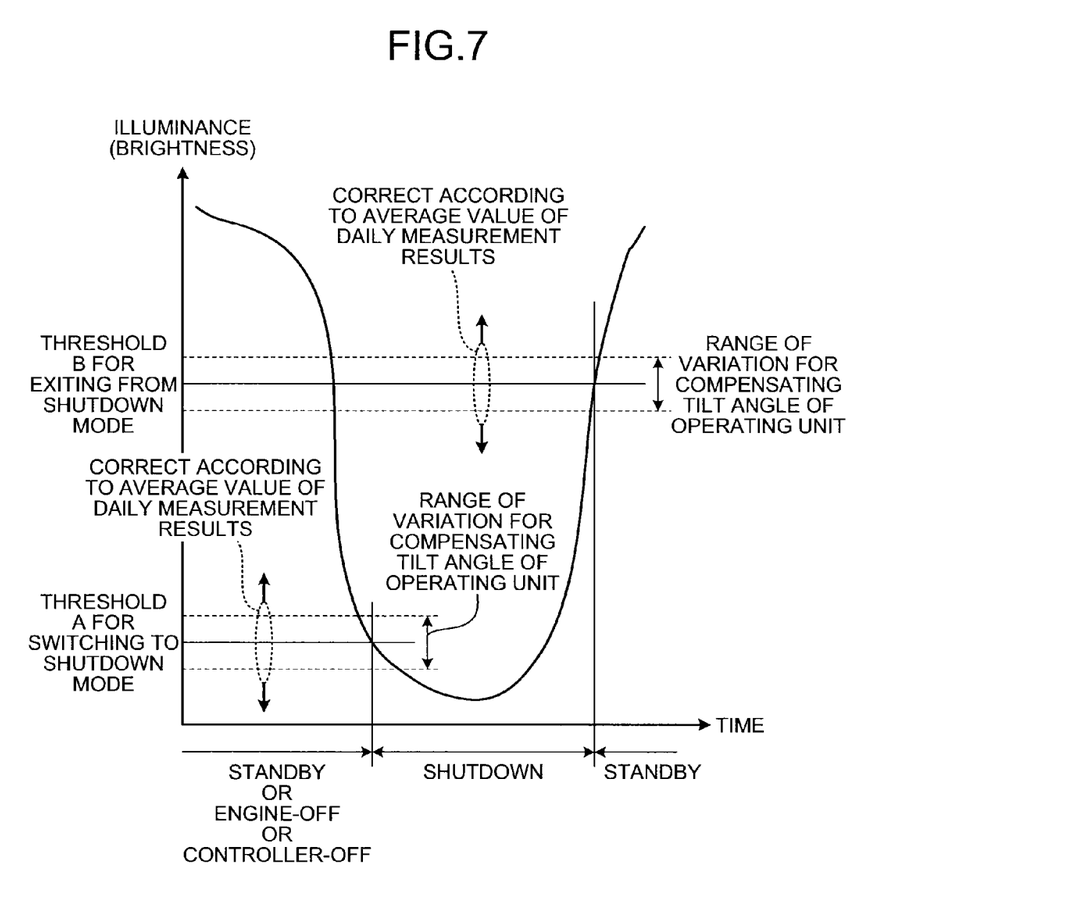
FIG. 7 is a diagram for explaining thresholds for detecting brightness.

Thresholds for detecting brightness are described below with reference to FIG. 7. FIG. 7 is a diagram for explaining the thresholds for detecting brightness. As illustrated in FIG. 7, the image forming apparatus 10 switches into the shutdown mode when a brightness level detected by the illuminance sensor 11g falls below a switching threshold A, at which switching into the shutdown mode is to occur. The image forming apparatus 10 switches into the standby mode when a brightness level detected by the illuminance sensor 11g exceeds an exiting threshold B, at which exiting from the shutdown mode is to occur.

The image forming apparatus 10 performs brightness detection at fixed time intervals. Different values can be set to the switching threshold A for switching into the shutdown mode and the exiting threshold B for exiting from the shutdown mode. Threshold determination performed by the image forming apparatus 10 preferably involves reducing influence of noise and the like. This reducing can be performed by, for example, omitting a maximum value and a minimum value from sampled data made up with several measurements performed at the fixed intervals and averaging the sampling data.

The image forming apparatus 10 performs determination for each of the thresholds A and B using an optimum threshold that is selected from a range of variation of the threshold for compensating tilt of the operating unit 11 in accordance with an actual tilt angle. As described with reference to FIG. 4, each of the thresholds can be set smaller or greater than the base threshold because threshold correction is performed by feeding back results of brightness measurement performed on a daily basis.

As described above, the image forming apparatus 10 according to the first embodiment detects an ambient brightness level at an arbitrary time zone; stores information indicating the detected brightness level; and determines the threshold serving as a criterion for switching into the low-power-consumption mode according to the stored information indicating the brightness level. The image forming apparatus 10 controls switching into the low-power-consumption mode appropriately by using the determined threshold.

The image forming apparatus 10 adjusts the threshold determined according to the information indicating the ambient brightness level in accordance with a tilt angle of the illuminance sensor 11g. As a result, influence of the tilt of the illuminance sensor 11g is minimized, and switching into the low-power-consumption mode can be controlled appropriately.

The image forming apparatus 10 detects ambient brightness levels at an arbitrary time zone on a daily basis, stores information indicating the detected brightness levels on the daily basis, and updates the threshold every day according to the stored information indicating the brightness levels on the daily basis. As a result, the image forming apparatus 10 can control switching into the low-power-consumption mode appropriately using the threshold that is optimum at much time.

The image forming apparatus 10 detects an ambient brightness level a plurality of times at each of desired time zones, stores information indicating the plurality of brightness levels, calculates an average brightness level for each of the time zones using the stored information indicating the brightness levels, and determines the threshold according to the calculated average brightness level for each time zone. As a result, influence of an abrupt change in brightness can be lessened, and therefore switching into the low-power-consumption mode can be controlled appropriately using the appropriate threshold.

The embodiment is described as an examples applied to of an image forming apparatus that is of a multifunction peripheral (MFP) having at least two functions of a copying function, a printer function, a scanner function, and a facsimile function; however, the embodiment can be applied to other type of image forming apparatus such as an MFP, a printer, a scanner, or a facsimile machine.

According to an aspect of the embodiments, switching into a low-power-consumption mode is done appropriately.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a detecting unit that detects an ambient brightness level at an arbitrary time zone;
a storing unit that stores information indicating the brightness level detected by the detecting unit;
a threshold determining unit that determines a threshold serving as a criterion for switching into a low-power-consumption mode according to the information indicating the brightness level stored in the storing unit; and
a control unit that controls switching into the low-power-consumption mode using the threshold determined by the threshold determining unit, wherein
the threshold determining unit adjusts the threshold determined according to the information indicating the ambient brightness level in accordance with a tilt angle of the detecting unit.

2. The image forming apparatus according to claim 1, wherein
the detecting unit detects the ambient brightness levels at the arbitrary time zone on a daily basis;
the storing unit stores information indicating the brightness levels detected by the detecting unit on the daily basis; and
the threshold determining unit updates the threshold every day according to the information indicating the brightness levels on the daily basis stored in the storing unit.

3. An electric-power control method for an image forming apparatus that includes a memory that stores information indicating an ambient brightness level, the electric-power control method comprising:
detecting, by a detecting device, an ambient brightness level at an arbitrary time zone;
determining a threshold that serves as a criterion for switching into a low-power-consumption mode according to the information indicating the brightness level stored in the memory; and
controlling switching to the low-power-consumption mode using the threshold determined at the determining, wherein
the determining includes adjusting the threshold determined according to the information indicating the ambient brightness level in accordance with a tilt angle of the detecting device.

4. An image forming apparatus comprising:
a detecting unit that detects an ambient brightness level at an arbitrary time zone;
a storing unit that stores information indicating the brightness level detected by the detecting unit;
a threshold determining unit that determines a threshold serving as a criterion for switching into a low-power-consumption mode according to the information indicating the brightness level stored in the storing unit; and
a control unit that controls switching into the low-power-consumption mode using the threshold determined by the threshold determining unit, wherein
the detecting unit detects the ambient brightness level a plurality of times at each of arbitrary time zones,
the storing unit stores information indicating plurality of brightness levels detected by the detecting unit, and
the threshold determining unit
calculates an average brightness level for each of the arbitrary time zones using the information indicating the brightness levels stored in the storing unit, and
determines the threshold according to the calculated average brightness level for each of the arbitrary time zones.

5. A controlled device in which a predetermined function is executed according to an operation received by an operating device, the controlled device comprising:
a detecting unit that detects an ambient brightness level at an arbitrary time zone;
a storing unit that stores information indicating the brightness level detected by the detecting unit;
a threshold determining unit that determines a threshold serving as a criterion for switching into a low-power-consumption mode according to the information indicating the brightness level stored in the storing unit; and
a control unit that controls switching into the low-power-consumption mode using the threshold determined by the threshold determining unit, wherein
the threshold determining unit adjusts the threshold determined according to the information indicating the ambient brightness level in accordance with a tilt angle of the operating device.

6. An operating device comprising:
a detecting unit that detects an ambient brightness level at an arbitrary time zone;
a storing unit that stores information indicating the brightness level detected by the detecting unit;

a threshold determining unit that determines a threshold serving as a criterion for switching into a low-power-consumption mode according to the information indicating the brightness level stored in the storing unit; and a control unit that controls switching into the low-power-consumption mode using the threshold determined by the threshold determining unit, wherein the threshold determining unit adjusts the threshold determined according to the information indicating the ambient brightness level in accordance with a tilt angle of the operating device.

* * * * *